Sept. 3, 1940.  D'ARCY A. YOUNG, JR  2,213,779
SLIDE CHANGING DEVICE FOR PROJECTORS
Filed March 3, 1939   2 Sheets-Sheet 1
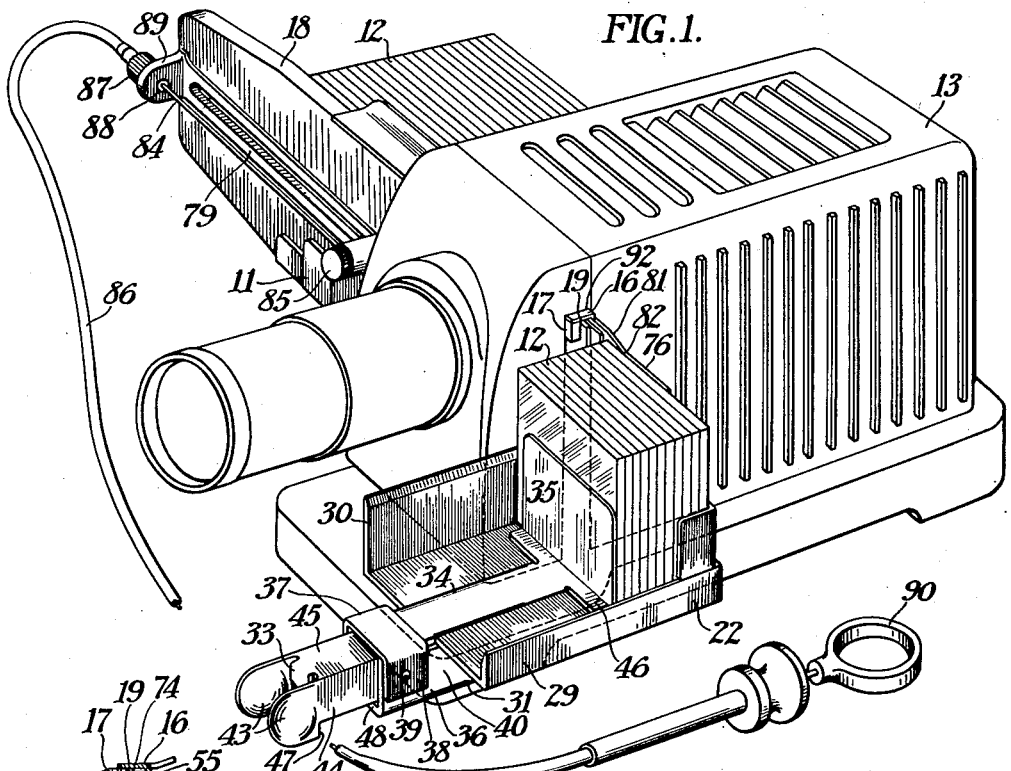
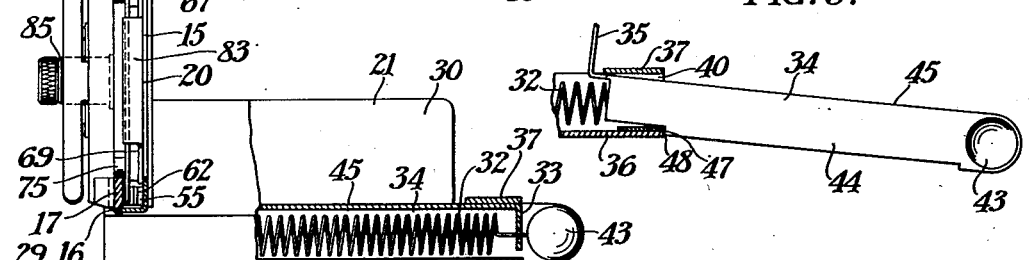
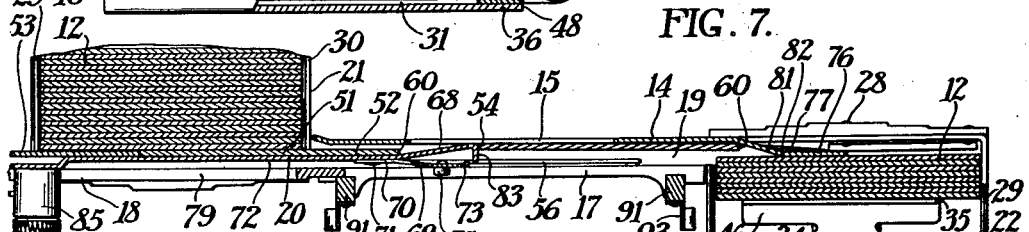
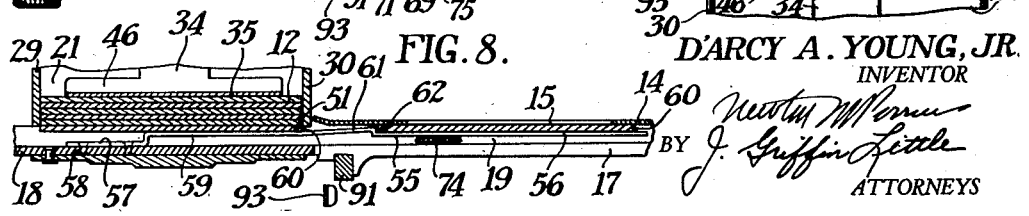
D'ARCY A. YOUNG, JR.
INVENTOR
ATTORNEYS

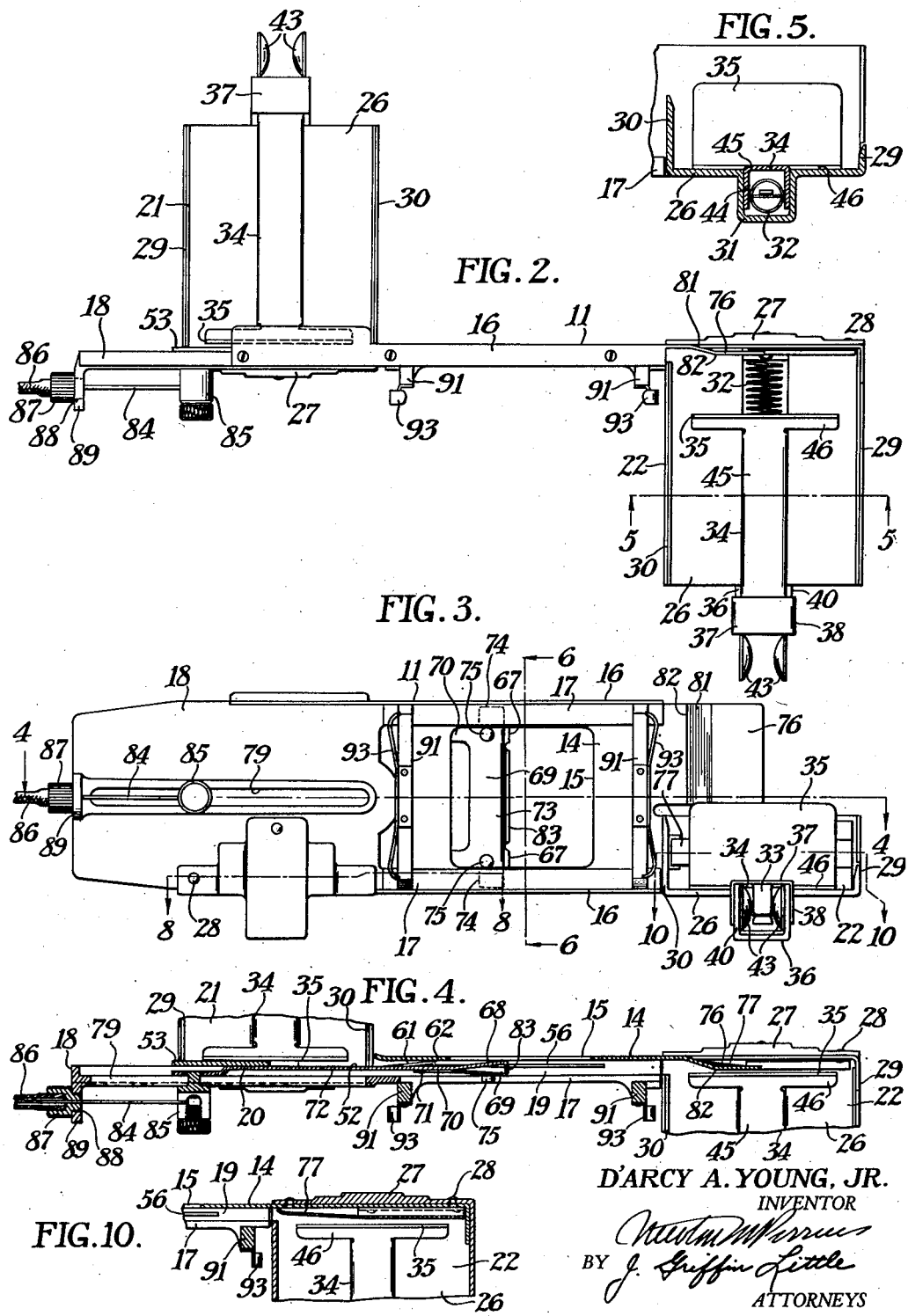

Patented Sept. 3, 1940

2,213,779

UNITED STATES PATENT OFFICE 2,213,779

SLIDE CHANGING DEVICE FOR PROJECTORS

D'Arcy A. Young, Jr., Rochester, N. Y., assignor to Eastman Kodak Company, Rochester, N. Y., a corporation of New Jersey Application March 3, 1939, Serial No. 259,604

8 Claims. (Cl. 88—28)

The present invention relates to projectors, and more particularly to a slide changing device by which transparency slides are moved into and out of projection position.

One object of the invention is the provision in a device of this kind of a slide shifting device which will move one slide out of projection position and simultaneously move another slide into such position.

Another object of the invention is the provision of a simple and easily operated mechanism for changing the slides.

A further object of the invention is the provision of an arrangement for retaining the slide in position to be engaged by the shifting mechanism so that the latter may move the slides into and out of projection position.

A still further object of the invention is the provision in a slide changing device of an arrangement by which the slides are retained in projection position upon return movement of the shifting member.

Yet another object of the invention is the provision of a spring actuated follower for retaining the slides in position in the slide magazine, and cooperating parts on the magazine and follower by which the latter may be retained in a retracted position to permit insertion of the slide in or removal of the slide from the magazine.

To these and other ends, the invention resides in certain improvements and combinations of parts all as will be hereinafter more fully described, the novel features being pointed out in the claims at the end of the specification.

In the drawings:

Fig. 1 is a perspective view of a projector, showing the relation thereto of a slide changing device constructed in accordance with the present invention;

Fig. 2 is a plan view of a slide changing device detached from the projector, showing the relation of the various parts of the device;

Fig. 3 is a front elevation view of the device illustrated in Fig. 2;

Fig. 4 is a horizontal sectional view through the device taken substantially on line 4—4 of Fig. 3, showing the relation of the slide shifting mechanism and the means for holding the slides in position in the magazine and also in registry with the projection aperture of the device;

Fig. 5 is a vertical sectional view through one of the slide magazines taken substantially on the line 5—5 of Fig. 2, showing the relation of the magazine parts;

Fig. 6 is a vertical sectional view taken substantially on line 6—6 of Fig. 3 with parts of the supply magazine in section, showing the arrangement for resiliently urging the slides into engagement with the shifting mechanism;

Fig. 7 is a view similar to Fig. 4, but with slides in position in the magazines, showing the arrangement by which the slide shifting member moves a slide out of projection position into the takeup magazine, and simultaneously moves a new slide from the supply magazine into projection position;

Fig. 8 is a fragmentary view of the apparatus shown in Fig. 7 with the slide shifting mechanism removed, and showing the spring members which resiliently retain the slides in position in registry with the projection aperture, and the shoulder on the springs which retains the slides in position when the shifting mechanism is returned to its starting position;

Fig. 9 is a fragmentary sectional view of one of the slide magazines, with parts in section and parts in elevation, showing the arrangement by which the slide follower may be held in a retracted position to facilitate insertion of slides in and removal of slides from the magazine; and Fig. 10 is a fragmentary view of a portion of the takeup magazine, taken substantially on line 10—10 of Fig. 3, showing the relation thereto of a leaf spring which serves to guide the various slides into position in the takeup magazine.

The same reference numerals throughout the various views indicate the same parts.

The present invention is embodied in a slide changing device, generally indicated by the numeral 11, arranged to move transparency slides, broadly designated at 12, into and out of projection position. The device 11 is adapted to be demountably secured in position on a projector of the type shown at 13, Fig. 1. As the projector itself, as well as the arrangement for demountably securing the device 11 thereto, constitutes no part of the present invention, a detailed showing is not deemed necessary for a complete understanding of the present invention.

The preferred form of slide changing device 11 comprises a flat plate 14 formed with a suitable aperture 15 which is positioned in alignment with the optical axis of the projector 13 when the device is mounted thereon, as shown in Fig. 1. The top and bottom edges of the plate 14 are bent over to form flanges 16 which are secured to spaced guide rails 17 formed on a channel-shaped plate 18. The flanges 16 cooperate with the rails 17 and the plate 18 to provide upper and lower slots or grooves 19 in which the edges of a slide shifter, generally indicated by the numeral 20, are reciprocally mounted. The plates 14 and 18 thus constitute a unitary structure, and may be broadly considered as a single apertured plate to the opposite ends of which are secured the slide supply and takeup magazines 21 and 22 respectively.

As both magazines are identical in structure, only one will be described in detail, the corresponding parts of both magazines being designated by the same numerals. Each magazine is formed by a single piece of metal to provide a bottom 26 and an upturned end 27 which is secured by rivets 28, or other suitable fastening means, to the plate 14 or 18, as shown in Fig. 3. The side edges of the bottom 26 are bent up to form a low side wall 29 and an opposite high side wall 30, both of which cooperate with the bottom 26 to retain the slides 12 in position, as is apparent from an inspection of Fig. 1. The bottom 26 has a central portion thereof depressed to provide a channel 31 in which is positioned a coil spring 32 one end of which is anchored to the channel while the other end is secured to a turned down lug 33 formed on the outer end of an inverted U-shaped guide 34 slidably mounted in the channel 31, as shown in Figs. 1 and 6. The forward or inner end of the guide 34 is formed with an upstanding plate or follower 35 which is urged by the spring 32 into engagement with the stack of slides 12 positioned in the magazine, as shown in Fig. 1. The position of the follower 35 obviously depends on the number of slides in the magazine.

The channel 31 preferably extends beyond the bottom 26, as shown at 36, Figs. 1, 2 and 6, and has the top thereof closed by an inverted U-shaped clip 37 the depending sides 38 of which are formed with small nibs 39 which extend into registering openings, not shown, in the sides 40 of the channel to detachably secure the clip thereto. This clip also serves to retain the guide 34 in the channel 31, as is apparent. By removing the clip, the guide 34 may be lifted out of the channel, and then by disengaging the spring 32, the guide may be detached from the magazine as will be apparent from inspection of the drawings.

When a group of slides 12 is to be inserted in or removed from the magazine, the guide 34 and its follower 35 are moved outwardly to a retracted position by engaging and pulling on a pair of finger-gripping members 43 formed from the materials of the sides 44 of the guide 34. The top 45 of the latter lies slightly above the plane of the bottom 26, see Fig. 5, and has the inner end formed to provide the bent up follower 35 as well as a cross member 46 which is arranged to overlie the bottom 26 and to engage the clip 37 to limit the retracting movement of the guide 34, as shown in Fig. 9.

The guide and follower may be held in this retracted position merely by depressing the outer end of the guide to bring a pair of shoulders 47 on the sides 44 into engagement with the end 48 of the channel 31, all as shown in Fig. 9. The guide and follower may be maintained in this retracted position, and a group of slides inserted in or removed from the magazine. Then by merely lifting the free end of the guide upwardly, see Fig. 9, the shoulders 47 will be moved out of engagement with the end 48 of the channel, and the spring 32 will now serve to move the guide 34 inwardly to yieldably press the follower 35 against the stack of slides 12, as shown in Fig. 1.

The resiliently pressed follower 35 in the supply magazine 21 serves to retain or hold the innermost slide 51 in engagement with the face 52 of the slide shifting member 20, as shown in Fig. 7. This shifting member is preferably in the form of a thin plate slidably or reciprocally mounted in the slots 19, and has secured to or formed integral with the face 52 thereof, a lug 53 adapted to be brought into engagement with the left edge 54 of the innermost slide 51, when the member 20 is slid to the right, as viewed in Fig. 7. Further rightward movement of the member 20 now serves to eject the slide 51 out of the supply magazine 21, along the slots 19, and into registry with the apertures 15, as shown in Fig. 8.

The positioned slide is then yieldably pressed against the plate 14 and maintained in registry with the aperture 15 thereof by means of a pair of leaf springs, broadly designated by the numeral 55. These springs are positioned within the slots 19 and are formed with free end portions 56 adapted to resiliently engage the slide adjacent the upper and lower edges thereof. The opposite ends 57 of these springs are suitably anchored to the plate 18 by rivets 58, or other suitable fastening means. Offset intermediate portions 59 of the springs 55 are engaged by the innermost slide 51 in the supply magazine 21, see Fig. 8. As the slide is moved to the right by the member 20, the right or leading edge 60 of the slide engages inclined sections 61 of the portions 59 to cam or tilt the springs 55 about the secured ends to permit the passage of the slide between the springs and the plate 14, as is apparent from inspection of Fig. 8. After the slide has been positioned in registry with the aperture 15, the left edge 54 is positioned behind shoulders 62 formed on the springs to prevent leftward movement of the positioned slide when the member 20 is moved to the left, in a manner and for a purpose to be later described.

After the slide has been moved into registry with the aperture 15, the member 20 is slid leftwardly, as viewed in Figs. 3, 4, and 7, to bring the lug 53 behind the left edge of the next innermost slide in the supply magazine. Now when the member 20 is again moved to the right, the next slide in the supply magazine is positioned in registry with the aperture 15, in a manner above described. Such rightward movement simultaneously brings the leading edge 67 of the member 20 into engagement with the edge 54 of the previously positioned slide to move the latter out of registry with the aperture 15 and into the takeup magazine 22. Thus the rightward movement of the member 20 serves to move a slide out of the supply magazine and into projecting position in registry with the aperture 15, and to simultaneously move the previously positioned slide out of projecting position into the takeup magazine.

In order to insure the positive engagement of the leading edge 67 with the left edge 54 of the previously positioned slide when the member 20 is slid to the right, the edge 67 is preferably slightly offset from the plane of the member 20, as shown at 68, Figs. 4 and 7, and is also yieldably pressed against the plate 14 by means of a U-shaped spring 69 the legs 70 of which are secured by rivets 71 to the face 72 of the member 20. The free end portion 73 of the spring is formed with tongues 74 which extend into the slots 19 to engage the rails 17 and to react on the latter to press or urge the edge 67 on the member 20 against the plate 14, as is apparent from an inspection of Figs. 4 and 7. When, however, the member 20 is slid to the left, the inclined portion 68 of the member 20 engages the edge 60 of the positioned slide and is cammed thereby, against the action of the spring 69, so that the edge 67 will slide over the rear of the positioned slide 12, the latter being held against reverse movement by the shoulders 62, as above described. Small lugs 75 are secured to the portion 73 of the spring 69 and ride on the rails 17 to retain the shifting member 20 to position in the slots 19.

When the member 20 is thus moved to the right, the edge 67 engages the positioned slide to shift the latter out of registry with the aperture 15 and into the takeup magazine 22, a new slide being simultaneously moved out of the supply magazine, as pointed out above. The slides 12 in the takeup magazine 22 are held slightly spaced from the plate 14, see Figs. 4 and 7, by means of an offset tongue 76 formed up from the plate 14 adjacent the top edge thereof. If desired, the plate 14 may also have secured thereto adjacent the bottom thereof a leaf spring 77 which cooperates with the tongue 76 to retain the slides 12 in the magazine 22 and in spaced relation with the plate 14, as shown in Fig. 7. One end of the spring 77 is secured by the rivets 28 to the plate 14, as clearly shown in Fig. 10.

As the previously positioned slide is moved toward the takeup magazine 22, the leading edge 60 of the slide engages an inclined cam 81 formed in the tongue 75, as best shown in Fig. 7. This cam serves to guide the leading edge between the tongue 75 and the slides already positioned in the takeup magazine, as is apparent from inspection of Fig. 7. As the slide now moves over the tongue 75 and spring 77, the trailing edge 54 of the slide moves from behind the springs 55. At this point, the slide will pivot on the edge 82 formed between the tongue 75 and the cam 81 so that the slide will be arranged parallel to the slides already positioned in the magazine 22. Such pivoting of the slide will move the edge 54 thereof out of alignment with the edge 67 of the member 20. At this point, however, the slide has not been fully moved into position in the takeup magazine. In order to further move the slide, the edge 67 of the member 20 is provided with a formed-up lug 83 arranged to engage the previously pivoted slide to move the latter into alignment with the other slides in the takeup magazine 22.

Any suitable means may be provided for shifting the member 20 to move the slides 12 into and out of projection position. In the present embodiment, the shifting means comprises a Bowden wire 84 connected to a post 85 which extends through a slot 79 in the plate 18 and is connected to the member 20. Thus the actuation of the wire 84 serves to operate the shifting member 20. The casing 86 of the wire 84 is provided with a threaded member 87 which engages a threaded opening 88 in a lug 89 formed on the plate 18 to anchor the casing thereto, as is apparent from inspection of Figs. 1 and 4. The other end of the wire 84 is provided with a finger ring 90 by which the wire may be moved in the casing 86 to actuate the shifting member 20, as is apparent from inspection of Fig. 1. By means of such an arrangement, the shifting of the slides into and out of projecting position may be accomplished from a position away from the projector, the advantages of which will be readily apparent to those in the art. Obviously, the wire 84 may be of any suitable length.

In order to insure the proper alignment of the aperture 15 with the optical axis of the projector 13, when the slide changing device is in position thereon, as shown in Fig. 1, the guide rails 17 are connected by a pair of vertically arranged lugs or strips 91 which are adapted to engage similar members, not shown, formed on the projector. Thus when a device is slid into the slot 92 of the projector, the lugs 91 and the complementary members or lugs on the projector engage to guide and position the device to align the aperture 15 with the optical axis of the projector. As different types of projectors have the complementary lugs thereon spaced slightly different distances apart, the lugs 91 are preferably provided with spring members 93 which are so arranged as to engage the differently spaced lugs on the projector, to insure the proper alignment of the aperture 15 with the optical axis of the projector.

The operation of the slide changing device may be briefly described as follows. When the ring 90, Fig. 1, is pulled outwardly, the post 85 and the shifting member 20 are pulled to the left, as viewed in Fig. 1. This movement serves to bring the lug 53 of the member 20 behind the left edge 54 of the innermost slide 51 in the supply magazine 21. Then when the ring 90 is pushed in, the member 20 is slid to the right to move this innermost slide into registry with the aperture 15. The slide is then returned to its original position by again pulling out the ring 90. In this return movement of the member 20, the yieldable end 67 thereof flexes so as to pass over the slide positioned in front of the aperture 15. The positioned slide is held against the aperture by springs 55, the shoulder 62 of which prevents reverse movement of the positioned slide when the member 20 is moved to the left. When, however, the member 20 is again moved to the right, the leading edge 67 and lug 83 thereof engages the slide positioned in front of the aperture and moves the slide over into the takeup magazine. This rightward movement also moves the next innermost slide in the supply magazine into position in registry with the aperture 15. Thus a single actuation of the member 20 to the right moves a previously positioned slide out of projection position into the takeup magazine, and also simultaneously moves a new slide from the supply magazine and into projecting position. Successive actuation of the member 20 serves to successively move new slides into and out of projection position. This operation is continued until all the slides in the supply magazine have been projected. The slides may now be removed from the takeup magazine by retracting the follower 35 and holding the latter in such retracted position, as shown in Fig. 9.

It is thus apparent from the above description that the present device provides a slide changing arrangement in which one slide may be moved out of projecting position and a new slide may be simultaneously moved into such position. Furthermore the shifting mechanism is simple, easy to operate, and may be controlled from a point distant from the projector. The slides in the supply magazine are positively held in position to be engaged by the shifting member, so that it is only necessary to place a supply of slides in the supply magazine, successively actuate the shifting member to move the slides into and out of projection position, and then remove the projected slides from the takeup magazine.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention and the scope of the appended claims.

I claim:

1. A slide changing device comprising, an apertured plate, slide magazines secured to the opposite ends of said plate, a slide follower positioned in each of said magazines and arranged to retain said slides in engagement with said plate, means slidably mounted on said plate for moving said slides into and out of registry with said aperture, means on said magazines for both detachably securing said followers thereto and for limiting the movement thereof in one direction, said followers being movable to a retracted position, and a shoulder on each of said followers adapted to engage a cooperating abutment on said magazine when the follower is moved to said retracted position to positively retain the follower in said position.

2. A slide changing device comprising, an apertured plate, slide magazines secured to the oppositie ends of said plate, a slide follower positioned in each of said magazines and arranged to retain said slides in engagement with said plate, means slidably mounted on said plate for moving said slides into and out of registry with said aperture, each of said magazines being formed with a bottom having a depending channel portion, a guide for said follower positioned in said channel, resilient means positioned in said channel and operatively connecting said guide to said magazine to yieldably urge said follower toward said plate to retain said slides there against, and a clip secured to said channel to detachably secure said guide and follower to said magazine and to limit the retracting movement of said follower.

3. A slide changing device comprising, an apertured plate, slide magazines secured to the opposite ends of said plate, a slide follower positioned in each of said magazines and arranged to retain said slides in engagement with said plate, means slidably mounted on said plate for moving said slides into and out of registry with said aperture, each of said magazines being formed with a bottom having a depending channel portion, a guide for said follower positioned in said channel, resilient means positioned in said channel and operatively connecting said guide to said magazine to yieldably urge said follower toward said plate to retain said slides there against, a shoulder on said guide arranged to engage a cooperating portion on said channel to retain said follower and guide in a retracted position, and means for limiting the retracting movement of said follower.

4. A slide changing device comprising, an apertured plate, slide magazines secured to the opposite ends of said plate, a slide follower positioned in each of said magazines and arranged to retain said slides in engagement with said plate, means slidably mounted on said plate for moving said slides into and out of registry with said aperture, each of said magazines being formed with a bottom having a depending channel portion, an inverted U-shaped guide slidably mounted in said channel and secured to and movable as a unit with said guide, a coil spring positioned in said channel and operatively connecting said guide to said magazine to yieldably urge said follower into engagement with slides positioned in the magazine, a shoulder formed on the outer end of said guide, said shoulder being arranged to engage the end of said channel when said guide and follower are retracted to hold said follower in retracted position, a spring clip for retaining said guide in said channel and for limiting the retracting movement of said follower, and finger gripping portions on said guide for moving said follower to said retracted position.

5. A slide changing device comprising, an apertured plate, slide supply and takeup magazines secured to opposite ends of said plate, a slide shifter movably mounted on said plate, means on said shifter for moving a slide from said supply magazine and into registry with said aperture and for simultaneously moving another slide out of registry with said aperture and into said takeup magazine when said shifter is moved in one direction, a pair of cantilever springs secured to said plate and having free end portions positioned adjacent said aperture to engage one face of said slide to yieldably retain the latter in registry with said aperture, and a shoulder on each of said springs for preventing reverse movement of the slides when said shifter is moved in the opposite direction.

6. A slide changing device comprising, an apertured plate, slide supply and takeup magazines secured to opposite ends of said plate, a slide shifter movably mounted on said plate, said shifter being formed with an edge arranged to engage a slide located in registry with said aperture and to move said slide out of such registry and into said takeup magazine when said shifter is moved in one direction, a lug on said shifter arranged to engage a second slide held in said supply magazine and to simultaneously move said second slide into position in registry with said aperture when said shifter is moved in said one direction, springs on said plate arranged to engage said second slide to retain the latter in registry with said aperture, a shoulder on said springs for maintaining said second slide in registry with said aperture when said shifter is moved in the opposite direction, said edge sliding over said positioned second slide when said shifter is moved in said opposite direction, and means for returning said edge to slide engaging and shifting position.

7. A slide changing device comprising, an apertured plate, slide supply and takeup magazines secured to opposite ends of said plate, a slide shifter movably mounted on said plate, said shifter being formed with an edge arranged to engage a slide located in registry with said aperture and to move said slide out of such registry and into said takeup magazine when said shifter is moved in one direction, a lug on said shifter arranged to engage a second slide held in said supply magazine and to simultaneously move said second slide into position in registry with said aperture when said shifter is moved in said one direction, springs on said plate arranged to engage said second slide to retain the latter in registry with said aperture, a shoulder on said springs for maintaining said second slide in registry with said aperture when said shifter is moved in the opposite direction, said edge sliding over said positioned second slide when said shifter is moved in said opposite direction, spring means mounted on said edge for returning the latter to position to engage and move said second slide out of registry with said aperture and into said takeup magazine when said shifter is again moved in said one direction, and means in said supply magazine for holding slides therein in position to be engaged by said lug when said shifter is moved in said one direction.

8. A slide changing device comprising, an apertured plate, slide supply and takeup magazines secured to opposite ends of said plate, a slide shifter movably mounted on said plate, said shifter being formed with an edge arranged to engage a slide located in registry with said aperture and to move said slide out of such registry and into said takeup magazine when said shifter is moved in one direction, a lug on said shifter arranged to engage a second slide held in said supply magazine and to simultaneously move said second slide into position in registry with said aperture when said shifter is moved in said one direction, springs on said plate arranged to engage said second slide to retain the latter in registry with said aperture, a shoulder on said springs for maintaining said second slide in registry with said aperture when said shifter is moved in the opposite direction, said edge sliding over said positioned second slide when said shifter is moved in said opposite direction, means for returning said edge to slide engaging and shifting position, a follower movably arranged in each of said magazines and adapted to engage slides mounted therein, means for resiliently holding said followers in engagement with the slides in said magazines, means on said followers for moving the latter to a retracted position, and means for retaining said followers in said retracted position.

D'ARCY A. YOUNG, Jr.